United States Patent Office
3,775,375
Patented Nov. 27, 1973

3,775,375
THERMOPLASTIC COPOLYETHERESTERS BASED ON 2,6-NAPHTHALENE-DICARBOXYLIC ACID
James Richard Wolfe, Jr., 1907 Kynwyd Road, Wilmington, Del. 19810
No Drawing. Filed June 20, 1972, Ser. No. 264,578
Int. Cl. C08g 17/08
U.S. Cl. 260—75 R     8 Claims

ABSTRACT OF THE DISCLOSURE

A segmented thermoplastic copolyetherester containing recurring polymeric long chain ester units derived predominantly from 2,6-naphthalenedicarboxylic acid and long chain glycols and short chain ester units derived predominantly from 2,6 - naphthalenedicarboxylic acid and low molecular weight diols. About 66–95% by weight of the copolyetherester consists of short chain ester units.

BACKGROUND OF THE INVENTION

Linear copolyetheresters have been produced heretofore for various purposes, particularly for the production of films and fibers, but known polymers of this type are not suitable for some applications, particularly those where unusually high tear strength, tensile strength and scuff resistance at elevated temperatures is needed. At the same time, the polymer must retain its rubbery characteristics; that is to say, not be too plastic. Illustrative applications include use in hydraulic hose, wire and cable covers and molded mechanical goods such as gears and cams. Thus a need for such a polymer exists.

SUMMARY OF THE INVENTION

According to this invention there is provided an improved thermoplastic copolyetherester which possesses the above-mentioned characteristics. The copolyetherester consists essentially of a multiplicity of recurring intralinear long chain and short chain ester units connected head-to-tail through ester linkages, said long chain ester units being represented by the following structure:

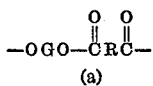

(a)

and said short chain ester units being represented by the following structure:

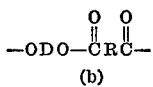

(b)

wherein:

G is a divalent radical remaining after removal of terminal hydroxyl groups from poly(alkylene oxide) glycols having a carbon-to-oxygen ratio of about 2.0–4.3 and molecular weight between about 400 and 6000;

R is a divalent radical remaining after removal of carboxyl groups from a dicarboxylic acid having a molecular weight less than about 300; at least about 70% and preferably at least about 90% of the dicarboxylic acid must be 2,6-naphthalene-dicarboxylic acid; and D is a divalent radical remaining after removal of hydroxyl groups from a low molecular weight diol having a molecular weight less than about 250;

with the provisos that the short chain ester units constitute about 66–95 weight percent of said copolyetherester and about 70–100% of said short chain ester units in the copolyetherester are identical. It is preferred that about 90–100% of said short-chain ester units are identical and most preferred that 95–100% of the short chain ester units are identical.

DETAILED DESCRIPTION

The term "long chain ester units" as applied to units in a polymer chain refers to the reaction product of a long chain glycol with a dicarboxylic acid. Such "long chain ester units" which are a repeating unit in the copolyetheresters of this invention, correspond to Formula a above. The long chain glycols are polymeric glycols having terminal (or as nearly terminal as possible) hydroxy groups and a molecular weight from about 400–6000. The long chain glycols used to prepare the copolyesters of this invention are poly(alkylene oxide) glycols having a carbon-to-oxygen ratio of about 2.0–4.3. Representative long chain glycols are poly(ethylene oxide) glycol, poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as 3-methyltetrahydrofuran (used in proportions such that the carbon-to-oxygen mole ratio in the glycol does not exceed about 4.3).

The term "short chain ester units" as applied to units in a polymer chain refers to low molecular weight compounds or polymer chain units having molecular weights less than about 550. They are made by reacting a low molecular weight diol (below about 250) with a dicarboxylic acid to form ester units represented by Formula b above.

Included among the low molecular weight diols which react to form short chain ester units are acyclic, alicyclic, and aromatic dihydroxy compounds. Preferred are diols with 2–15 carbon atoms such as ethylene, propylene, tetramethylene, pentamethylene, 2,2 - dimethyltrimethylene, hexamethylene, and decamethylene glycols, dihydroxy cyclohexane, cyclohexane dimethanol, resorcinol, hydroquinone, 1,5-dihydroxy naphthalene, etc. Especially preferred are aliphatic diols containing 2–8 carbon atoms. Included among the bis-phenols which can be used are bis(p-hydroxy) diphenyl, bis(p-hydroxyphenyl) methane, and bis(p-hydroxyphenyl) propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives; provided, however, that the molecular weight requirement pertains to the diol only and not to its derivatives.

Dicarboxylic acids, in addition to the required 2,6-naphthalenedicarboxylic acids, which can be reacted with the foregoing long chain glycols and low molecular weight diols to produce the copolyetheresters of this invention are aliphatic, cycloaliphatic, or aromatic dicarboxylic acids of a low molecular weight, i.e., having a molecular weight of less than about 300. The term "dicarboxylic acids" as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —$SO_2$—.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethylmalonic acid, allylmalonic acid, 4-cyclohexane-1,2-dicarboxylic acid, 2-ethylsuberic acid, 2,2,3,3-tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylene-bis-(cyclohexane carboxylic acid), 3,4-furan dicarboxylic acid, and 1,1-cyclobutane dicarboxylic acid. Preferred aliphatic acids are cyclohexanedicarboxylic acids and adipic acid.

Representative aromatic dicarboxylic acids which can be used in addition to 2,6-naphthalenedicarboxylic acid include terephthalic, phthalic and isophthalic acids, bibenzoic acid, substituted dicarboxyl compounds with two benzene nuclei such as bis(p-carboxyphenyl)methane, p-oxy(p-carboxyphenyl) benzoic acid, ethylene-bis(p-oxybenzoic acid), 1,5-naphthalene dicarboxylic acid, 2,7-naphthalene dicarboxylic acid, phenanthrene dicarboxylic acid, 4,4'-sulfonyl dibenzoic acid, and $C_1$–$C_{12}$ alkyl and ring substitution derivatives thereof, such as halo, alkoxy, and aryl derivatives. Hydroxyl acids such as p(β-hydroxyethoxy) benzoic acid can also be used providing an aromatic dicarboxylic acid is also present.

It is essential that at least about 70% and preferably at least about 90% of the dicarboxylic acid is 2,6-naphthalene dicarboxylic acid. In the most preferred embodiment of the instant invention 95–100% of the dicarboxylic acid is 2,6-naphthalene dicarboxylic acid.

It is also essential that about 70%, preferably about 90–100%, of the short chain ester units are identical and it is most preferred that 95–100% of the units are identical. Polymers meeting these requirements exhibit an unusual level of properties such as tensile strength and tear strength while retaining their rubbery characteristics.

The short chain ester units will constitute about 66–95 weight percent of the copolyetherester. The remainder of the copolyetherester will be the long chain ester units, ergo, the long chain units will comprise about 5–34 weight percent of the copolyetherester.

Most preferred segmented copolyetheresters for use in this invention are those prepared from 2,6-naphthalene dicarboxylic acid, glycols such as poly(tetramethylene oxide) glycol having a molecular weight of about 600–2000 or poly(ethylene oxide) glycol having a molecular weight of about 600–1500 and diols such as 1,4-butanediol. Other preferred copolyesters are those prepared from 2,6-naphthalenedicarboxylic acid, and poly(propylene oxide) glycol having a molecular weight of about 600–1600. The polymers based on poly(tetramethylene oxide) glycol are especially preferred because they are easily prepared, have overall superior physical properties, and are especially resistant to water.

The dicarboxylic acids, e.g. 2,6-naphthalenedicarboxylic acid, or their derivatives and the polymeric glycol are incorporated into the final product in the same molar proportions as are present in the reaction mixture. The amount of low molecular weight diol actually incorporated corresponds to the difference between the moles of diacid and polymeric glycol present in the reaction mixture. When mixtures of low molecular weight diols are employed, the amounts of each diol incorporated is largely a function of the amounts of the diols present, their boiling points, and relative reactivities. The total amount of diol incorporated is still the difference between moles of diacid and polymeric glycol.

The polymers described herein can be made conveniently by starting with a conventional ester interchange reaction. A preferred procedure involves heating the dimethyl ester of 2,6-naphthalenedicarboxylic acid with a long chain glycol and a molar excess of 1,4-butanediol in the presence of a catalyst at 150–260° C. while distilling off methanol formed by the ester interchange. Depending on temperature, catalyst, diol excess, and equipment, this reaction can be completed within a few minutes to a few hours. This procedure results in the preparation of a low molecular weight prepolymer which can be carried to a high molecular weight copolyester of this invention by the procedure described below. Such prepolymers can also be prepared by a number of alternate esterification or ester interchange processes; for example, the long chain glycol can be reacted with a high or low molecular weight short chain ester homopolymer or copolymer in the presence of catalyst until randomization occurs. The short chain ester homopolymer or copolymer can be prepared by ester interchange from either the dimethyl esters and low molecular weight diols, as above, or from the free acids with the diol acetates. Alternatively, the short chain ester copolymer can be prepared by direct esterification from appropriate acids, anhydrides, or acid chlorides, for example, with diols or by other processes such as reaction of the acids with cyclic ethers or carbonates. Obviously, the prepolymer might also be prepared by running these processes in the presence of the long chain glycol.

The resulting prepolymer is then carried to high molecular weight by distillation of the excess of short chain diol. This process is known as "polycondensation."

Additional ester interchange occurs during this polycondensation or distillation; the distillation serves to increase the molecular weight and to randomize the arrangement of the copolyester units. Best results are usually obtained if this final distillation or polycondensation is run at less than 5 mm. Hg pressure and about 220–260° C. for less than 4 hours, e.g., 0.5–1.5 hours in the presence of antioxidants such as sym-di-beta-naphthyl-p-phenylenediamine and 1,3,5-trimethyl-2,4,6-tris[3,5-ditertiarybutyl-4-hydroxybenzyl]benzene. Most practical polymerization techniques rely upon ester interchange to complete the polymerization reaction. In order to avoid excessive hold time at high temperatures with possible irreversible thermal degradation, a catalyst for the ester interchange reaction should be employed. While a wide variety of catalysts can be used organic titanates such as tetrabutyl titanate used alone or in combination with magnesium or calcium acetates are preferred. Complex titanates, such as Mg[HTi(OR)$_6$]$_2$, derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight diols, for example, butanediol in terphenyl, are conveniently removed during high polymerization by azeotropic distillation. Other special polymerization techniques, for example, interfacial polymerization of bisphenol with bisacylhalides and bisacylhalide capped linear diols, may prove useful for preparation of specific polymers. Both batch and continuous methods can be used for any stage of copolyester polymer preparation. Polycondensation of prepolymer can also be accomplished in the solid phase by heating divided solid prepolymer in a vacuum or in a stream of inert gas to remove liberated low molecular weight diol. This method has the advantage of reducing degradation because it must be used at temperatures below the softening point of the prepolymer.

The processes described above can be run both by batch and continuous methods. The preferred method for continuous polymerization, i.e., by ester interchange with a prepolymer, is a well established commercial process.

Although the copolyesters of this invention possess many desirable properties, it is sometimes desirable to stabilize certain of the compositions to heat or radiation by ultra-violet light. Fortunately, this can be done very readily by incorporating stabilizers in the polyester compositions. Satsifactory stabilizers comprise phenols and their derivatives, amines and their derivatives, compounds containing both hydroxyl and amine groups, hydroxyazines, oximes, polymeric phenolic esters and salts of multivalent metals in which the metal is in its lower valence state.

Representative phenol derivatives useful as stabilizers include 4,4' - bis(2,6 - ditertiary-butylphenol), 1,3,5-trimethyl - 2, 4, 6-tris[3,5-ditertiary-butyl-4-hydroxybenzyl] benzene and 4,4' - butylidene - bis(6-tertiary-butyl-m-cresol). Various inorganic metal salts or hydroxides can be used as well as organic complexes such as nickel dibutyl dithiocarbamate, manganese salicylate and copper 3-phenyl-salicylate. Typical amine stabilizers include N,N' - bis(beta - naphtyl)-p-phenylene-diamine, N,N'-bis(1-methylheptyl) - p - phenylene diamine and either phenyl-beta-naphthyl amine or its reaction products with aldehydes. Mixtures of hindered phenols with esters of thiodiproprionic acid, mercaptides and phosphite esters are particularly useful. Additional stabilization to ultra-violet light can be obtained by compounding with pigments or with various UV absorbers such as substituted benzophenones or benzotriazoles.

The properties of these copolyesters can be modified by incorporation of various conventional inorganic fillers such as carbon black, silica gel, alumina, clays and chopped fiber glass. In general, these additives have the effect of increasing the modulus of the material at various elongations. Compounds having a range of hardness values can be obtained by blending hard and soft polyesters of this invention.

Many of the copolyesters have useful tensile properties at temperatures as high as 220° C. In addition, the co-polyetherester of this invention retain their strength after extended exposure to a variety of organic fluids (including hydraulic fluids) at temperatures as high as 150° C., which is generally in contrast to the performance of prior art copolyetheresters.

Because of their resistance to solvents at elevated temperatures, the copolymers are particularly useful for the inner tube in hydraulic hoses. The general toughness of the copolymers coupled with their good high temperature properties makes them useful for the exterior covering on hydraulic hose. Often such coverings can be thinner than is usual when the copolymers of this invention are employed. The high level of physical properties also makes the copolymers outstanding for use in molded mechanical goods such as gears, cams, universal joints, etc.

The polymers of this invention have relatively low melt viscosity (particularly at low shear), excellent thermal stability at processing tempeature, rapid hardening rates, good flow and mold wetting characteristics, and relative insensitivity to moisture. They may thus be processed by substantially all procedures which have been used for thermoplastics in general, and in many instances, they offer significant processing advantage over competitive thermoplastic polymers. They are especially effective in injection molding and high speed extrusion applications because of their rapid hardening rates. The materials can be injection, compression, transfer and blow molded to form articles which may include inserts, if desired, meeting close tolerances. Because of their melt viscosity and stability, they can be used for melt and puddle casting. They can readily extruded to produce films (blown or unblown), tubing, other forms having complicated cross-sections, and cross-heat extruded for hose, wire, cable, and other substrate covers. They can be melt spun to form fibers and filaments. They can be readily calendered to produce films and sheeting or to produce calender-coat woven and non-woven fabrics and other substances.

In finely divided form, the polymers of this invention offer the above-mentioned processing advantages for procedures employing powdered thermoplastics. In addition, they can be used in crumb form. The unique flow characteristics of these polymers give excellent definition on molded surfaces and facilitate fusion bonding procedures such as rotational molding (either one or two axis methods), slush molding and centrifugal molding as well as powder coating techniques such as fluidized bed, electrostatic spray, flame spray, flock coating, powder flow coating, cloud chamber and heat fused coating (for flexible substrates.)

The melt viscosity and stability characteristics of these polymers offer advantages for use in certain coating and adhesive procedures such as dip, transfer, roll and knife coating and hot melt adhesives. These same advantages are useful in various combining and laminating operations such as hot roll, web and flame laminating as well as other thermoplastic heat sealing processes. The low melt viscosity of these polymers permits the use of more delicate substrates in combining, laminating and calendaring operations and allows penetration into the substrate, if desired.

All parts, proportions and percentages disclosed herein are by weight unless otherwise indicated.

The following examples illustrate the invention.

EXAMPLES

The following ASTM methods are employed in determining the properties of the polymers prepared in the examples which follow.

Modulus at 100% elongation, $M_{100}$ _____ D412
Modulus at 300% elongation, $M_{300}$ _____ D412
Tensile at break, $T_B$ _____ D412
Elongation at break, $E_B$ _____ D412
Hardness, Shore D _____ D1484
Trouser tear _____ [1] D470

[1] Modified by use of 1.5" x 3" sample with 1.5" cut on the long axis of the sample. This configuration prevents "necking down" at the point of tearing.

EXAMPLE 1

The following materials were placed in a 400 ml. reaction kettle fitted for distillation:

Poly(tetramethylene ether) glycol; number average
  molecular weight about 980 ml. _____ 11.3
1,4-butadediol, ml. _____ 27.3
Dimethyl 2,6-naphthalenedicarboxylate, ml. ____ 40.5
N,N'-di-beta-naphthyl-p-phenylenediamine, ml. __ 0.165

A stainless steel stirrer with a paddle cut to conform with the internal radius of the kettle was positioned about ⅛" from the bottom of the kettle. Air in the kettle was replaced with nitrogen. The kettle was placed in an oil bath at about 190–210° C. After the reaction mixture becomes molten, 0.36 ml. of catalyst solution was added and agitation was started. Over a period of about 30 minutes the temperature of the oil bath was raised to 255–265° C. When the temperature reached 255–265° C., the pressure in the kettle was gradually reduced to 0.1 mm. Hg or less over a period of about 40 minutes. The polymerization mass was agitated at 255–265° C. and less than 0.1 mm. Hg for 20–30 minutes. The resulting viscous molten product was scraped from the kettle in a nitrogen (water and oxygen free) atmosphere and allowed to cool. The inherent viscosity of the product at a concentration of 0.1 gm./dcl. in m-cresol at 30° C. was 1.3. Samples for physical testing were prepared by compression molding at about 250° C. and cooling rapidly in the press.

The catalyst solution was prepared as follows: Magnesium diacetate tetrahydrate was dried for twenty-four hours at 150° C. under vacuum with a nitrogen bleed. A mixture of 11.2 gm. of dried and powdered magnesium diacetate and 200 ml. of methanol was heated at reflux for 2 hours. The mixture was cooled and 44.4 ml. of tetrabutyl titanate and 150 ml. of 1,4-butanediol were added with cooling.

From the ratios of starting materials the copolymer was calculated to have the composition 76% (wt.) tetramethylene 2,6-naphthalenedicarboxylate/24% (wt.) poly(tetramethylene ether) 2,6-naphthalenedicarboxylate. The properties of the copolymer are as follows:

$M_{100}$ (p.s.i.) _____ 3360
$M_{300}$ (p.s.i.) _____ 4100
$T_B$ (p.s.i.) _____ 6800
$E_B$ (percent) _____ 370
Shore D hardness _____ 66
Trouser tear, 50 in./min. (p.l.i.) _____ 1730

The copolymer has excellent physical properties in general, but its tear strength is exceptionally high. An analogous copolymer based on terephthalic acid, i.e., having 76% tetramethylene terephthalate units and 24% (wt.) poly(tetramethylene ether) terephthalate units prepared by substantially the same technique had a tear strength less than half that of the copolymer of this example.

Example 2

A copolymer was prepared in a manner similar to that of Example 1 using the following materials:

A block copolyether glycol of the structure HO—A—B—A—H, having a number average molecular weight of 1150, where

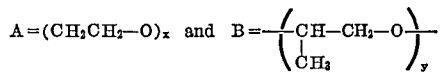

The B unit has a molecular weight of 801–1000 and the A units constitute 10–20% by weight of
the block copolymer, gm. _____ 11.4
1,4-butanediol, ml. _____ 27.3
Dimethyl 2,6-naphthalenedicarboxylate, gm. ___ 40.2
N,N'-di-beta-naphthyl-p-phenylenediamine, gm. __ 0.165
Catalyst solution of Example 1, ml. _____ 0.36

Agitation under reduced pressure was carried out for 30 minutes at 257–265° C. and 0.12–0.17 mm. of Hg. The inherent viscosity of the product was 0.96. The properties of the copolymer were as follows:

$M_{100}$ _____ 3050
$M_{300}$ _____ 3500
$T_B$ _____ 6000
$E_B$ _____ 420
Shore D hardness _____ 63
Trouser tear, 50 in./min. _____ 1090

From the ratios of starting materials the copolymer was calculated to contain 76% (wt.) of the recurring short chain ester segment, tetramethylene 2,6-naphthalenedicarboxylate.

An analogous copolymer based on terephthalate and containing 76% (wt.) tetramethylene terephthalate units, prepared by substantially the same technique, had only about one-third the tear strength of the polymer of this example.

Example 3

A copolymer was prepared in a manner similar to that of Example 1 using the following materials:

Poly(propylene ether) glycol; number average molecular weight about 1000, gm. _____ 11.2
1,4-butanediol, ml. _____ 20.5
Dimethyl 2,6-naphthalenedicarboxylate, gm. ____ 40.5
N,N'-di-beta-naphthyl-p-phenylenediamine, gm. __ 0.165
Catalyst solution of Example 1, ml. _____ 0.36

Agitation under reduced pressure was carried out for 90 minutes at 250–260° C. and .04–.06 mm. of Hg. The product had an inherent viscosity of 1.2. The properties of the copolymer were as follows:

$M_{100}$ _____ 3200
$M_{300}$ _____ 4520
$T_B$ _____ 6040
$E_B$ _____ 340
Shore D hardness _____ 66
Trouser tear, 50 in./min. _____ 961

From the ratios of starting materials the copolymer was calculated to have the composition 76% (wt.) tetramethylene 2,6-naphthalenedicarboxylate/24% (wt.) poly(propylene ether) 2,6-naphthalenedicarboxylate.

An analogous copolymer in which terephthalic acid replaces the 2,6-naphthalenedicarboxylic acid, i.e., 76% (wt.) tetramethylene terephthalate/24% (wt.) poly(propylene ether) terephthalate, prepared by substantially the same technique, had a tear strength of less than one-third that of the copolymer of this example.

Example 4

A polyester-polyether copolymer was prepared by the following procedure:

In an agitated 5000 ml. reactor fitted with a distillation column a mixture of 600 ml. of ethylene glycol, 1206 gm. of dimethyl 2,6-naphthalenedicarboxylate, 6.3 gm. of N,N'-di-beta-naphthyl-p-phenylenediamine and 14.4 ml. of the catalyst solution of Example 1 were heated to reflux. The reflux rate was adjusted so that the temperature at the head of the distillation column was maintained at 66° C. while 355 ml. of distillate were removed. An additional 41 ml. were collected between 66 and 72° C. The residue in the distillation flask was cast into pans and crushed.

A copolymer was prepared in a manner similar to that of Example 1 using the following materials:
Polytetramethylene ether glycol; number average
  molecular weight about 980, gm. _____ 11.2
Dimethyl 2,6-naphthalenedicarboxylate/ethylene
  glycol reaction product, gm. _____ 57.0
N,N'-di-beta-naphthyl-p-phenylenediamine, gm. __ 0.165
Catalyst solution of Example 1, ml. _____ 0.36

The agitation under reduced pressure was carried out for 30 minutes at 250–260° C. and 0.10–0.18 mm. of Hg. The product could not be completely solubilized at a concentration of 0.1 g./dcl. in m-cresol at 30° C.

The properties of the polyester-polyether copolymer are listed below:

$M_{100}$ _____ 2950
$T_B$ _____ 3200
$E_B$ _____ 240
Shore D hardness _____ 72
Trouser tear, 50 in./min. _____ 1164

From the ratios of starting materials the copolymer was calculated to have the composition 76% (wt.) ethylene 2,6-naphthalenedicarboxylate/24% (wt.) poly(tetramethylene ether) 2,6-naphthalenedicarboxylate.

An analogous copolymer containing 76% (wt.) ethylene terephthalate/24% (wt.) poly(tetramethylene ether) terephthalate, prepared by substantially the same technique, had less than half the tear strength of the polymer of this example.

Example 5

A copolymer was prepared in a manner similar to that of Example 4 using the following materials:

| | |
|---|---|
| The block copolyether glycol described in Example 2, gm. | 11.4 |
| Dimethyl 2,6 - naphthalenedicarboxylate/ethylene glycol reaction product of Example 4, gm. | 56.4 |
| N,N'-di-beta-naphthyl-p-phenylenediamine, gm. | 0.165 |
| Catalyst solution of Example 1, ml. | 0.36 |

The product cannot be completely solubilized at a concentration of 0.1 g./dcl. in m-cresol at 30° C. The properties of the polyester-polyether copolymer are listed below.

| | |
|---|---|
| $M_{100}$ | 3080 |
| $M_{300}$ | 3120 |
| $T_B$ | 3400 |
| $E_B$ | 520 |
| Shore D hardness | 76 |
| Trouser tear, 50 in./min. | 870 |

From the ratios of starting materials the copolymer was calculated to contain 76% (wt.) of the recurring short chain ester segment, ethylene 2,6-naphthalenedicarboxylate.

An analogous copolymer in which terephthalic acid replaces naphthalenedicarboxylic acid (containing 76% (wt.) ethylene terephthalate units), prepared by substantially the same techniques, has a tear strength of less than one-third that of the copolymer of this example.

What is claimed is:

1. A segmented thermoplastic copolyetherester composition consisting essentially of (a) a multiplicity of recurring long chain ester units and short chain ester units joined head-to-tail through ester linkages, said long chain ester units being represented by the formula (I) 

and said short chain units being represented by the formula (II) 

where G is a divalent radical remaining after the removal of terminal hydroxyl groups from a poly(alkylene oxide) glycol having a molecular weight of about 400–6000 and a carbon-to-oxygen ratio of about 2.0–4.3; R is a divalent radical remaining after removal of carboxyl groups from a dicarboxylic acid having a molecular weight less than about 300 and D is a divalent radical remaining after removal of hydroxyl groups from a diol having a molecular weight less than about 250; provided that at least about 70% of the R groups untilized are derived from 2,6-naphthalenedicarboxylic acid, (b) about 70–100% of said short chain ester units are identical and (c) said short chain ester units amount to about 66–95 percent by weight of said copolyetherester.

2. A composition of claim 1 wherein at least about 90% of the R groups are derived from 2,6-naphthalenedicarboxylic acid and about 90–100% of said short chain ester units are identical.

3. A composition of claim 1 wherein said glycol is poly(tetramethylene oxide) glycol having a molecular weight of about 600–2000.

4. A composition of claim 3 wherein said diol is 1,4-butane diol.

5. A composition of claim 1 wherein said diol is ethylene glycol.

6. A composition of claim 1 wherein said glycol is poly(propylene ether) glycol.

7. A composition of claim 1 wherein said glycol is poly(ethylene oxide) glycol.

8. A composition of claim 1 wherein said glycol is poly(tetramethylene oxide) glycol having a molecular weight of about 600–2000, said dicarboxylic acid is 2,6-naphthalenedicarboxylic acid and said diol is 1,4-butanediol.

References Cited

UNITED STATES PATENTS

| | | |
|---|---|---|
| 2,865,891 | 12/1958 | Michel. |
| 3,013,914 | 12/1961 | Willard. |
| 3,023,192 | 2/1962 | Shivers. |
| 3,651,014 | 3/1972 | Witsiepe. |

MELVIN GOLDSTEIN, Primary Examiner

U.S. Cl. X.R.

260—40 R, P, 45.75 R, C, N, 45.8 N, 45.9 R, 45.95, 47 C, 75 H, S